United States Patent Office 3,751,437
Patented Aug. 7, 1973

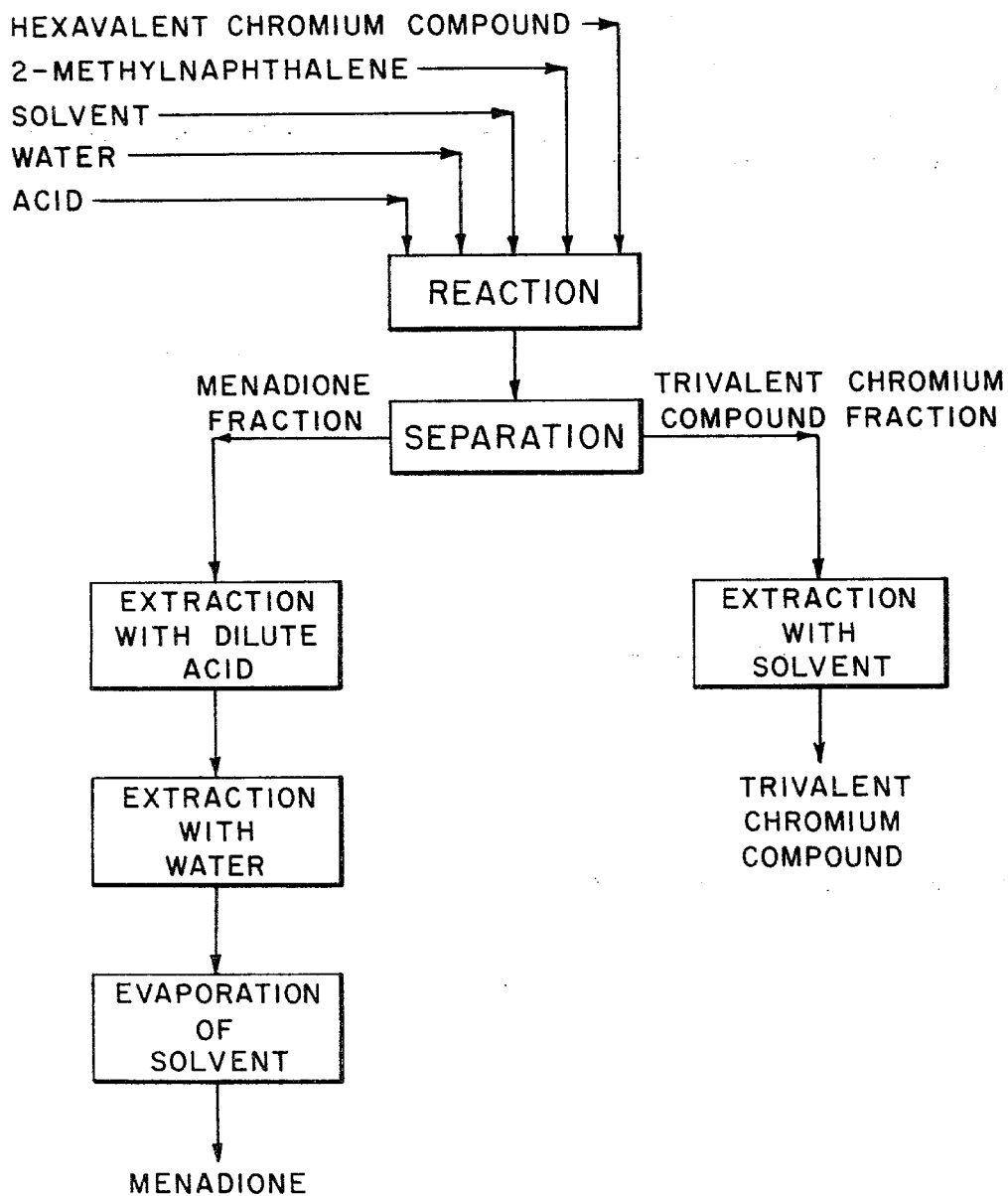

3,751,437
BATCH AND CONTINUOUS PROCESS FOR
PREPARING MENADIONE
Francis Huba, Painesville, Ohio, assignor to Diamond
Shamrock Corporation, Cleveland, Ohio
Filed July 6, 1970, Ser. No. 52,361
Int. Cl. C07c 49/66
U.S. Cl. 260—396 R           4 Claims

ABSTRACT OF THE DISCLOSURE

Menadione is prepared by a batch or a continuous process using 2-methylnaphthalene, a hexavalent chromium compound, a mineral acid, water, pyridine and, if desired, an inert organic solvent. Reactants are fed into the reactor at rates and conditions which provide continuous oxidation of 2-methylnaphthalene to menadione. The process produces five times as much product per unit volume of reactor space as a batch process under comparable conditions.

BACKGROUND OF THE INVENTION

(1) Field of the invention

This invention relates to a continuous menadione process and more particularly to a continuous process employing 2-methyl-naphthalene, a hexavalent chromium compound, a mineral acid, water and, if desired, an organic solvent. This invention also provides an improved process for the manufacture of menadione which produces more product per unit volume of reactor space per unit time than can be produced in a batch process under comparable conditions.

(2) Description of the prior art

Menadione also known as 2-methyl-1,4-napthoquinone, Vitamin $K_3$ has been used for many years in the prophylaxis and treatment of hypoprothrombinemia in both human and veterinary medicine. Numerous processes for the manufacture of menadione have been reported in the literature. Most of these processes are based on batchwise oxidation of 2-methylnaphthalene($\beta$-methylnaphthalene) with an oxidizing agent such as chromic oxide in acetic acid, hydrogen peroxide in acetic acid, sodium dichromate in sulfuric acid or the like. Many problems have been encountered with these batch processes. These problems include positive control of a highly exothermic reaction, prevention of deterioration of the product by overoxidation, use of a heterogeneous and viscous reaction system as well as other problems such as greater exposure of personnel resulting from the inherent nature of the system.

SUMMARY OF THE INVENTION

The present invention relates to a continuous process for the production of menadione wherein 2-methylnapthalene, a hexavalent chromium compound, a mineral acid such as hydrochloric acid or sulfuric acid and an inert solvent, if desired, are added at such rates to a reactor maintained at a reaction temperature of from about 38° to about 95° C. so that oxidation of 2-methylnaphthalene to menadione occurs over a reaction time of from about 0.5 to about 20 hours, and the reaction products are removed from the reactor continuously and separated to obtain the menadione. If desired, a catalytic amount of a catalyst such as pyridine can be added to accelerate the reaction.

It is an object of the present invention to provide a continuous process for the manufacture of menadione. A further object is to provide an improved process wherein larger quantities of menadione can be produced per unit volume of reactor space than in a batch process under comparable conditions. Another object is to provide a continuous process for the manufacture of menadione using pyridine as a catalyst to accelerate oxidation. It is intended, however, that the detailed description and specific examples do not limit the present invention but merely indicate preferred embodiments thereof since various changes and modifications within the scope of this invention will become apparent to those skilled in the art.

The above objects as well as other objects of this invention have been achieved by addition of from about 0.5 to about 2.5 moles of 2-methylnaphthalene, from about 0.9 to 5 moles of a hexavalent chromium compound per mole of 2-methylnaphthalene, from about 1.8 to about 16 moles of a mineral acid such as hydrochloric acid or sulfuric acid per mole of 2-methylnaphthalene and from 0 to about 2 liter of inert solvent per mole of 2-methylnaphthalene at such rates to a reactor maintained at a reaction temperature of from about 38° to 95° C. so that oxidation of 2-methylnaphthalene to menadione occurs over a reaction time of from about 0.5 to about 20 hours and the reaction products are removed continuously from the reactor and thereafter separated and processed continuously to obtain the menadione and chrome liquor as separate products. If desired, the oxidation can be accelerated by addition of a catalytic amount of a catalyst such as pyridine.

The continuous process of this invention can be used to produce about 5 times the quantity of menadione produced by a batch process per unit volume of reactor space under comparable conditions. When pyridine is used as a catalyst, the continuous process can be used to produce more than 10 times the quantity produced by the batch process without catalyst per unit volume of reactor space per unit time.

BRIEF DESCRIPTION OF THE DRAWING

The drawing is a flowsheet showing a system wherein the continuous process of the present invention can be operated.

DESCRIPTION OF PREFERRED EMBODIMENTS

The reactants can be added as solids, dispersions, or solutions. For example, 2-methylnaphthalene can be added directly or in the form of a dispersion or solution. When it is added in solution form, the solution may contain from about 0.5 to about 5 moles of 2-methylnaphthalene per liter of inert solvent. Useful inert solvents include acetic acid, carbon tetrachloride, chloroform, methylene chloride, dichloroethane, dichloroethylene, perchloroethylene, pyridine, benzene, carbon disulfide or the like. When pyridine is used as an inert solvent, a small amount of the pyridine present functions as a catalyst. This dual role is consistent with the accepted catalyst definition given in The Condensed Chemical Dictionary, p. 187, Reinhold Publishing Corp., New York, N.Y., 1966. The hexavalent chromium compound can be added as a solid, dispersion or solution. Useful hexavalent chromium compounds include sodium chromate, sodium dichromate, chromic acid or the like. When the hexavalent chromium compound is added in solution form, it can be added as an aqueous solution containing from about 1 to 8 moles of the compound per liter of water. The concentration of the sulfuric acid can be from about 65 to 80% by weight.

The reactants can be added to a reactor maintained at a temperature of from about 38° to about 95° C. as three separate feeds, i.e., (1) a 2-methylnaphthalene feed, (2) a hexavalent chromium compound feed and (3) a sulfuric acid feed. The feeds should be at such rates that for from about 0.5 to about 2.5 moles of 2-methylnaphthalene, there is present from about 0.9 to 5 moles of a hexavalent chromium compound, from about 1.8 to about 16 moles of mineral acid and from 0 to about 2 liter of inert solvent per mole of 2-methylnaphthalene and oxidation of 2-methylnaphthalene to menadione occurs over a reaction time of from about 0.5 to about 20 hours. The reaction products are removed continuously from the reactor and thereafter separated and processed continuously to obtain the menadione. Chromic salt is produced in the form of chrome liquor as a by-product. Chrome liquor, containing the salt of chromic sulfate, is useful as an agent in the tanning of leather.

For example, an aqueous solution of a hexavalent chromium compound, a carbon tetrachloride solution of 2-methylnaphthalene and a 78% by weight sulfuric acid solution are fed simultaneously and continuously into a reactor. The three solutions are fed at rates which provide a mean residence time of about 0.5 to about 2 hours in the reactor. The mixture of reaction products is continuously discharged from the reactor into a kettle where the mixture is cooled, diluted with carbon tetrachloride and water to facilitate handling and processing. The diluted mixture is then filtered to remove solid materials such as insoluble chromium compounds, polymerized menadione or the like.

The filtrate is fed into a separator where the carbon tetrachloride solution of menadione and chrome liquor separate to form two distinct and separate phases. Chrome liquor separates to form the upper phase while the carbon tetrachloride solution of menadione separates to form the lower phase.

The chrome liquor fraction from the separator is then fed into the lower part of a vertical countercurrent extractor column or tower. Traces of menadione are removed from the chrome liquor fraction by countercurrent extraction with carbon tetrachloride. Carbon tetrachloride is introduced into the extractor column in the upper part and flows downward while chrome liquor is introduced into the column in the lower part and flows upward at the same time. By the time the chrome liquor reaches the top of the extractor, the chrome liquor is substantially free of menadione and is satisfactory for transfer to storage for conversion to a tanning agent. The carbon tetrachloride used in the extraction of the chrome liquor flows to the bottom of the extractor tower. The carbon tetrachloride which is removed from the bottom of the extractor contains traces of menadione and is combined with the carbon tetrachloride solution of menadione which had been removed from the separator as the lower phase.

The resulting carbon tetrachloride solution of menadione is fed into the upper part of a vertical countercurrent extractor column. Traces of chromium and other metal ions are removed from the carbon tetrachloride solution by countercurrent extraction with a dilute sulfuric acid (5% by weight) wash. Carbon tetrachloride solution is introduced into the extractor column in the upper part and flows downward while the dilute sulfuric acid wash is introduced into the column in the lower part and flows upward at the same time. While the carbon tetrachloride solution of menadione is being removed from the bottom of the extractor, the dilute acid wash is being removed from the top of the extractor. The acid washed carbon tetrachloride solution of menadione is transferred to another countercurrent extractor for washing with water, while the used dilute acid, waste acid, is discarded.

The acid washed carbon tetrachloride solution of menadione is then fed into the upper part of a vertical countercurrent extractor. Traces of dilute sulfuric acid are removed from the carbon tetrachloride solution of menadione by washing with water. Carbon tetrachloride solution is introduced into the upper part of the extractor column and flows downward while water is introduced into the lower part of the column and flows upward. Water washed carbon tetrachloride solution of menadione is being removed from the bottom of the extractor, while the water wash is being removed from the top of the extractor. The washed carbon tetrachloride solution of menadione is then charged into a water stripper for drying. The used water removed from the top of the extractor tower is discharged as waste water.

After the carbon tetrachloride solution is dried by stripping off water, the dried solution of carbon tetrachloride is transferred to storage in a hold tank. The dried solution is taken from storage and charged to a still where the solution is concentrated by distilling off carbon tetrachloride. When most of the carbon tetrachloride has been removed and the menadione is sufficiently concentrated in the form of a molten residuum in the still, the molten menadione is removed from the still, transferred to a flaker and flaked to obtain flaked menadione.

Chromic acid can be substituted for sodium bichromate, hydrochloric acid for sulfuric acid and chloroform for carbon tetrachloride to produce menadione and chromium chloride ($CrCl_3$) in th process of this invention.

Countercurrent extractors used in the present invention can be any of the continuous (differential) contact equipment described in Perry's Chemical Engineers Handbook (4th ed., 1963) Section 21, pages 23–35. The extractor can be either a gravity or centrifuge operated extractor.

Reference is now made to FIG. 1 which is a flowsheet showing a system wherein the continuous process of the present invention can be operated. Reactants are continuously introduced into a reactor wherein reaction occurs while a mixture of reaction products is being removed from the reactor. Although the steps shown in FIG. 1 are a preferred embodiment of the present invention, they are not to be regarded as limitations. For example, the reactor is equipped with a mixing means to provide intimate contact between the reactants. This mixing means may be an agitator, circulating pump or other type of mixer. If desired, there may be a plurality of blades, paddles or the like attached to the mixing means. The reaction is very exothermic and means for adequate heat control to keep the reaction at the desired temperature, must be provided.

During reaction in the reactor, a mixture of reaction products is being continuously removed from the reactor, diluted with sufficient inert solvent and water to facilitate processing and transferred to a separator wherein separation of the mixture into two distinct and separate phases occurs, that is, an upper phase which is the trivalent chromium fraction and a lower phase which is the menadione fraction. The trivalent chromium fraction, which is the upper phase, can be continuously removed from the separator and introduced in the lower section of a countercurrent extractor for extraction with solvent. The trivalent chromium compound fraction can flow to the top of the extractor while the solvent (carbon tetrachloride) is continuously being introduced into the upper section of the extractor and flows to the bottom of the extractor. Trivalent chromium compound in the form of a solution can be continuously removed from the top of the extractor and can be used directly or transferred to storage. The solvent which collects at the bottom of the extractor contains traces of menadione that have been extracted from the chromium compound. This solvent extract can be removed from the bottom of the extractor and combined with the menadione fraction removed from the bottom of he separtor as the lower phase.

The resulting menadione fraction can then be washed with dilute hydrochloric or sulfuric acid to remove traces of chromium and other metal ions. The menadione fraction can be continuously introduced into the upper section of a countercurrent extractor and will flow to the bottom of the extractor while a dilute acid wash solution is being continuously introduced into the lower section of the extractor so that the acid solution flows to the top of the extractor. After extraction with the dilute acid, the menadione fraction is removed from the bottom of acid extractor and introduced into the upper section of a water extractor while the acid washed from the top of the extractor is discharged to the sewer as waste acid.

The resulting acid washed menadione fraction can then be extracted with water to remove traces of acid by continuously introducing the acid washed menadione fraction into the upper section of a water extractor wherein the fraction flows to the bottom of the extractor and is collected while water introduced into the lower section of the water extractor flows to the top of extraction unit where the wash water is discharged to the sewer as waste water. The water washed menadione fraction can be removed from the bottom of the water extractor unit and solvent removed. For example, the menadione fraction can be transferred to a water stripper where the solution is dried by stripping off the water. After drying, the dried menadione fraction can be transferred to a hold tank from which the fraction can be transferred to a still or evaporator wherein the solvent can be removed by distillation to obtain menadione in molten form. Molten menadione is transferred from the still or evaporator to a flaker and flaked to obtain flaked menadione.

For a fuller understanding of the nature and objects of this invention, reference may be made to the following examples. These examples are given merely to illustrate the invention and are not to be construed in a limiting sense. All quantities, proportions and percentages are by weight and all references to temperature are ° C. unless otherwise indicated.

EXAMPLE 1

This example illustrates the continuous process of the present invention using a tube reactor and pyridine as a catalyst.

Into a 1⅞" outside diameter, 39" long glass tube reactor positioned horizontally, equipped with an internal multiblade agitator, feeding ports, adjustable level control, thermometers, reflux condensers and external cooling, the following reactants were fed continuously and simultaneously as three separate feeds over a period of 8.5 hours:

(1) 4580 ml. carbon tetrachloride solution containing 916 g. (6.46 m.) 2-methylnaphthalene, 3550 ml. carbon tetrachloride and 147 g. (1.86 m.) pyridine as a catalyst;
(2) 4971 ml. sodium bichromate solution containing 5230 g. (17.53 m.) $Na_2Cr_2O_7 \cdot 2H_2O$ and 2780 ml. water; and
(3) 4630 ml. sulfuric acid solution containing 6770 g. of 96% by weight $H_2SO_4$ (65 m.) and 770 ml. water.

Temperatures along the tube during reaction varied between 55° and 80° C. and the mean residence time of the reactants in the tube was 36 minutes.

The continuously discharged reaction mixture was diluted with an additional one volume of water and a half volume of carbon tetrachloride and was introduced into the first column of the three-vertical-column system wherein chrome liquor was separated from the carbon tetrachloride solution of menadione. The mixture separated into two phases. The upper phase was the chrome liquor phase and the lower phase was a carbon tetrachloride solution of menadione.

The chrome liquor upper phase was continuously removed from the top of the column and introduced into the lower section of the second column which was packed and served as a countercurrent extractor. The chrome liquor was extracted with carbon tetrachloride to remove traces of menadione. Carbon tetrachloride was continuously introduced into the upper section of the second column, flowed down the column and collected at the bottom of the column while the chrome liquor was continuously introduced into the lower section, flowed up the column and collected at the top of the column. The chrome liquor which collected at the top of the column was removed from the extractor and transferred to storage. The carbon tetrachloride which collected at the bottom of the column contained traces of menadione and was combined with the carbon tetrachloride solution of menadione removed from the first column as the lower phase.

The combined carbon tetrachloride solution was introduced into the upper section of the third column which was packed and served as a countercurrent extractor. The carbon tetrachloride solution was extracted with dilute 5% by weight sulfuric acid solution to remove traces of chromium and other metal ions. The carbon tetrachloride solution of menadione was continuously introduced into the upper section of the third column, flowed down the column and collected at the bottom of the column while the dilute sulfuric acid solution was continuously introduced into the lower section of the column, flowed up the column and collected at the top.

The acid washed carbon tetrachloride solution of menadione, which collected at the bottom of the third column, was dried by passing through a calcium chloride drier, charged to distillation pot and distilled to remove carbon tetrachloride and to concentrate the menadione. After the menadione was sufficiently concentrated, it was removed from the distillation pot in molten form and cooled to obtain 682 g. of menadione in crystalline form.

Analysis by vapor phase chromatography showed the product contained 94.7% menadione, 5% unreacted 2-methylnaphthalene and 0.3% unidentified by-products. The product had a melting point of 95°–98° C. A 60.2% yield of pure menadione was obtained based on total quantity of 2-methylnaphthalene used as the starting material. The quantity of menadione produced was about 10 times as much as that produced by a batch process per volume of reactor space per man hour under otherwise similar conditions, yield and quality.

EXAMPLE 2

This example illustrates the continuous process of the present invention wherein two kettles were used instead of a tube reactor.

The first kettle was a one liter, 4-neck glass resin pot equipped with a glass cooling coil positioned along the inner wall so that the coil serves as a multiple baffle. The kettle was equipped with an agitator having five titanium paddles. Four paddles were slanted so as to move the reaction mixture downward and the fifth paddle, the bottom paddle, arranged to move the reaction mixture out and upward. Agitator speed varied between 300–400 r.p.m. Level of the reaction mixture was maintained by an adjustable overflow tube and was kept at or below the top paddle. Reaction temperatures were measured by a thermometer. Reactants were fed into the kettle continuously by hand or mechanically so that after 26 minutes mean residence time in the first kettle, the reaction mixture overflowed the first kettle and into the second kettle which was a similarly equipped three-liter, 4-neck glass resin pot.

The reaction mixture was agitated at the same temperature (69°–71° C.) for 68 minutes mean residence time in the second kettle and then continuously discharged.

The continuously discharged reaction mixture was diluted with an additional one volume of water and processed to recover menadione in the same manner as in Example 1. During the 111 minutes of operation, the following reactants were fed continuously and simultaneously as three separate feeds to the first kettle:

(1) 654 ml. carbon tetrachloride solution containing 144 g. (1.014 m.) 2-methylnaphthalene;
(2) 1065 ml. sodium bichromate solution containing 1252 g. (4.21 m.) of sodium bichromate; and
(3) 1300 ml. sulfuric acid solution containing 1750 g. (17.86 m.) of sulfuric acid.

A total of 103.1 g. of dried, crystalline menadione was obtained from the process. Vapor phase chromatographic analysis showed the product contained 97% menadione, 2.3% unreacted 2-methylnaphthalene and 0.7% unidentified by-products. The quantity of menadione produced by this method is about 5 times higher per volume of reactor space per man hour than that from the batch process (Example 3).

EXAMPLE 3

This example illustrates use of the batch process of the prior art and is outside the scope of the present invention.

A 3-liter, creased, round bottom glass flask was equipped with an agitator, thermometer, 500-ml. graduated addition funnel and reflux condenser. This flask was connected with a gas meter so that the volume of gases produced during reaction could be recorded. The flask was immersed in a temperature controlling bath so that it could be heated and cooled during the process.

A solution containing 100 g. (0.7 m.) of 2-methylnaphthalene dissolved in 360 ml. of carbon tetrachloride and having a volume of 460 ml. was charged into the flask. Then, a solution containing 525 g. (1.76 m.) of sodium bichromate was added to the flask. The resulting mixture was agitated and heated to 65°–70° C.

A total of 960 g. of 76% by weight sulfuric acid having a volume of 570 ml. was then added over a 45 minute period to the agitated reaction mixture at 74°–68° C. After the acid addition was complete, the reaction mixture was agitated for an additional 90 minutes at 74°–68° C. Analysis of the reaction mixture indicated that 94% of the 2-methylnaphthalene in the mixture had reacted.

A liter of cold water and 200 ml. of carbon tetrachloride were added to the reaction mixture. The resulting reaction mixture was stirred for 20 minutes, cooled to room temperature and then transferred to a separatory funnel. The aqueous phase, which was chrome liquor, was separated and extracted with carbon tetrachloride to remove traces of menadione. The carbon tetrachloride phase which contained most of the menadione was combined with the carbon tetrachloride extract used to wash the aqueous phase. The resulting carbon tetrachloride solution of menadione was extracted with four 200 ml. portions of 5% sulfuric acid to remove traces of chromium and other metal ions, then dried with calcium chloride and filtered. Carbon tetrachloride was removed from the solution by distillation under reduced pressure. Menadione was recovered from the distillation in molten form and was flaked. The entire procedure including reaction time required about 9 hours. A total of 64 g. of 95% pure menadione was obtained representing a yield of 57%. The product had a melting point of 91°–100° C. and contained about 4.7% of 2-methylnaphthalene, the starting material, as an impurity.

EXAMPLE 4

This example illustrates use of pyridine as a catalyst in a batch process and is within the scope of the present invention.

The procedure of Example 3 was repeated with the exception that 15 g. of pyridine was added as a catalyst to the carbon tetrachloride solution of 2-methylnaphthalene. Rate of reaction was followed by vapor phase chromatographic analysis. It was found by this analysis that after the 45 minute addition of sulfuric acid, and then 15 minutes of agitation, i.e., a total of one hour, 98% of the 2-methylnaphthalene, the starting material, had reacted. That is, the pyridine catalyst had shortened the reaction time to less than one half time required for the batch process procedure in Example 3, as well as improving the yield and purity of the product. Menadione was recovered from the reaction mixture using the procedure of Example 3. A total of 73.7 g. of menadione was obtained representing a yield of 61.3%.

Results obtained in Examples 1–4, inclusive, are shown in Table I entitled "Comparison of Productivity of Batch and Continuous Menadione Processes." These results show that the continuous process using pyridine as a catalyst is more than 10 times as productive as a conventional batch process without pyridine as a catalyst per unit volume of reactor space per man hour time whereas a continuous process where pyridine was not used as a catalyst is about 5 times as productive as a conventional batch process where pyridine was not used as a catalyst.

TABLE I.—COMPARISON OF PRODUCTIVITY OF BATCH AND CONTINUOUS MENADIONE PROCESSES

| Example | Type of process | Catalyst | Total reaction time, hr. | Work-up time, hr. | Menadione produced Weight, grams | Menadione produced Yield, percent | Product, wt. per unit vol. of reactor per hr., g. |
|---|---|---|---|---|---|---|---|
| 3 | Batch | None | 2.5 | 6.0 | 64 | 57 | 7.5 |
| 4 | do | Pyridine | 1.0 | 6.0 | 73.7 | 61.3 | 8.8 |
| 2 | Continuous | None | 2.0 | None | 100.0 | 57.5 | 50.0 |
| 1 | do | Pyridine | 8.5 | None | 682 | 60.2 | 80.0 |

EXAMPLES 5–10 (INCLUSIVE)

The two kettle reactor continuous menadione process without catalyst described in Example 2 was used in Examples 5–10, inclusive. Reactants and reactor conditions used in Examples 5–10, inclusive, as well as the results obtained are shown in Table II entitled "Additional Examples of the Menadione Continuous Process." These examples further illustrate the advantages of the continuous process over the batch process without catalyst.

TABLE II.—ADDITIONAL EXAMPLES OF THE MENADIONE CONTINUOUS PROCESS
[Reaction carried out in 2-kettle reactor without catalyst]

| Example number | 5 | 6 | 7 | 8 | 9 | 10 |
|---|---|---|---|---|---|---|
| Reactants: | | | | | | |
| 2-methylnaphthalene (ml.) | 525 | 669 | 654 | 492 | 834 | 714 |
| Conc., m./l. in carbon tetrachloride | 1.55 | 1.50 | 1.6 | 1.55 | 1.55 | 1.55 |
| Moles | 0.814 | 1.00 | 1.046 | 0.762 | 1.29 | 1.11 |
| Weight, g | 115.7 | 142 | 148.4 | 108.1 | 183 | 157.3 |
| Percent of theory | 100 | 100 | 100 | 100 | 100 | 100 |
| Sulfuric acid (ml.) | 985 | 1,315 | 1,360 | 895 | 1,590 | 1,255 |
| Conc., m./l | 13.53 | 13.53 | 13.53 | 13.53 | 13.53 | 13.74 |
| Moles | 13.33 | 17.80 | 18.40 | 10.05 | 21.50 | 16.87 |
| Weight, g | 1,307 | 1,740 | 1,800 | 983 | 2,107 | 1,650 |
| Percent of theory | 410 | 446 | 421 | 330 | 409 | 380 |
| Sodium dichromate (ml.) | 1,070 | 990 | 1,060 | 650 | 1,540 | 1,035 |
| Conc., m./l | 3.99 | 3.99 | 3.99 | 3.99 | 4.00 | 3.95 |
| Moles | 4.27 | 3.95 | 4.22 | 2.59 | 6.15 | 4.09 |
| Weight, g | 1,271 | 1,153 | 1,256 | 772 | 1,830 | 1,218 |
| Percent of theory | 524 | 395 | 403 | 339 | 477 | 369 |

TABLE II—Continued

| Example number | 5 | 6 | 7 | 8 | 9 | 10 |
|---|---|---|---|---|---|---|
| Reactor conditions: | | | | | | |
| 1st kettle, ° C: | 70 | 71 | 70 | 70 | 71 | 71 |
| Capacity (ml.) | 815 | 765 | 717 | 650 | 630 | 718 |
| Residence time (min.) | 28 | 25 | 26 | 26 | 26 | 26 |
| Conversion (percent) | 70 | 88 | 82 | 83 | 83 | 86.6 |
| 2d kettle, ° C: | 70 | 71 | 71 | 70 | 69 | 71 |
| Capacity (ml.) | 1,765 | 1,774 | 1,572 | 1,400 | 1,800 | 1,782 |
| Residence time (min.) | 61 | 62 | 60 | 55 | 60 | 65 |
| Conversion (percent) | 86 | 92 | 96 | 90 | 93 | 90.5 |
| Results: | | | | | | |
| Unreacted 2-methylnaphthalene, percent | 2.0 | 3.2 | 2.2 | 3.7 | 2.0 | 1.4 |
| Menadione (g.) pure | 68.6 | 93.7 | 85.7 | 72.0 | 116.7 | 106.5 |
| Mole | 0.396 | 0.544 | 0.498 | 0.418 | 0.670 | 0.62 |
| Pure yield, percent | 49 | 54.4 | 47.7 | 54.8 | 52.6 | 55.8 |
| Crude yield, percent | 50.5 | 58 | 50.2 | 59.6 | 55 | 57.7 |
| Purity, percent | 97 | 93.7 | 95 | 92 | 95.6 | 97 |

EXAMPLE 11

This example illustrates the continuous process of the present invention wherein one reactor was used instead of two, hydrochloric acid instead of sulfuric acid, anhydrous chromic acid instead of bichromate, chloroform instead of carbon tetrachloride. The reaction temperature was 58°–62° instead of 68°–72° C. The mean residence time was 40 minutes.

In carrying out the reaction, the following reagents were charged continuously and simultaneously into the reactor:

720 ml. (883 g.) 31% hydrochloric acid solution containing 259 g. (7.07 m.) of HCl 585 ml. CrO₃ solution containing 500 g. (5 m.) of anhydrous chromic acid, and 270 ml. chloroform solution of 100 grams (0.7 m.) of 2-methylnaphthalene For initiation, 150 ml. of chrome-liquor, recovered from a preceding similar reaction was charged into the reactor, agitated and heated to 58° C. After 40 minutes of feeding, removal of the reaction mixture was started and maintained at the rate of charging. The feeding was stopped after 1.5 hours and the mixture was drained and cooled. The cold reaction mixture was processed in the usual manner described in Example 1. The recovered crude, dry product weighed 95.0 g. Analysis by vapor phase chromatography found the following mole percent: 18.8% unreacted 2-methylnaphthalene, 79% menadione and three other impurities totaling 2.2%. The calculated pure menadione in the crude product is 77.7 g. (0.451 m.) representing a yield of 76%, based on the reacted 2-methylnaphthalene. Purification of the product could be done by crystallization, distillation or by preparation of its bisulfite adduct which is Vitamin K₃, the water soluble form of menadione and as such can be separated from most of the impurities being in the crude material.

What is claimed is:

1. A process for producing menadione which comprises:
  (A) charging into a reactor
    (1) from about 0.5 to about 2.5 moles of 2-methylnaphthalene,
    (2) from about 0.9 to 5 moles of a hexavalent chromium compound per mole of the 2-methylnaphthalene,
    (3) from about 1.8 to about 16 moles of a mineral acid selected from the group consisting of hydrochloric acid and sulfuric acid per mole of the 2-methylnaphthalene,
    (4) from 0 to about 2 liters of an inert solvent per mole of the 2-methylnaphthalene and
    (5) a catalytic amount of pyridine, then
  (B) reacting together the 2-methylnaphthalene and the chromium compound in the presence of the acid, the solvent and the pyridine in the reactor at a reaction temperature of from about 38° C. to about 95° C. until reaction is substantially complete, thereafter
  (C) removing the reaction products from the reactor, then
  (D) separating the reaction products as a menadione fraction and a trivalent chromium fraction.

2. The process of claim 1 wherein the acid is sulfuric acid and the solvent is carbon tetrachloride.

3. A continuous process for producing menadione which comprises
  (A) adding 2-methylnaphthalene, a hexavalent chromium compound, a catalytic amount of pyridine and a mineral acid selected from the group consisting of hydrochloric acid and sulfuric acid to a reactor at rates to provide continuous production of reaction products of the 2-methylnaphthalene and the chromium compound, then
  (B) reacting together the 2-methylnaphthalene and the chromium compound in the presence of the acid and pyridine at a reaction temperature of from about 38° C. to about 95° C. over a residence time of from about 0.5 to about 20 hours in the reactor, thereafter
  (C) removing the reaction products from the reactor, then
  (D) separating the reaction products as a menadione fraction and a trivalent chromium compound fraction.

4. The process of claim 3 wherein the acid is sulfuric acid.

References Cited
UNITED STATES PATENTS

| 2,402,226 | 6/1946 | Hyman et al. | 260—396 |
| 3,513,178 | 5/1970 | Joo et al. | 260—396 |
| 3,534,069 | 10/1970 | Joo et al. | 260—396 |

VIVIAN GARNER, Primary Examiner

U.S. Cl. X.R.

260—438.5 R